United States Patent
Finkelstein et al.

(10) Patent No.: US 7,934,110 B2
(45) Date of Patent: Apr. 26, 2011

(54) DYNAMICALLY MANAGING THERMAL LEVELS IN A PROCESSING SYSTEM

(75) Inventors: Lev Finkelstein, Netanya (IL); Aviad Cohen, Kfar Vitkin (IL); Ronny Ronen, Haifa (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 11/861,186

(22) Filed: Sep. 25, 2007

(65) Prior Publication Data

US 2009/0083551 A1   Mar. 26, 2009

(51) Int. Cl.
G06F 1/26 (2006.01)
G06F 1/22 (2006.01)

(52) U.S. Cl. ......... 713/320; 713/300; 713/322; 718/102

(58) Field of Classification Search .................. 713/300, 713/320, 322; 718/102
See application file for complete search history.

(56) References Cited

U.S. PATENT DOCUMENTS

| | | | |
|---|---|---|---|
| 7,174,469 B2* | 2/2007 | Luick | 713/300 |
| 7,389,403 B1* | 6/2008 | Alpert et al. | 712/10 |
| 2002/0043563 A1* | 4/2002 | Ishii | 235/462.01 |
| 2005/0071701 A1* | 3/2005 | Luick | 713/320 |
| 2008/0022076 A1* | 1/2008 | Krieger et al. | 712/220 |
| 2008/0115010 A1* | 5/2008 | Rothman et al. | 714/10 |
| 2008/0236175 A1* | 10/2008 | Chaparro Monferrer et al. | 62/3.2 |
| 2008/0310099 A1* | 12/2008 | Monferrer et al. | 361/687 |
| 2009/0064164 A1* | 3/2009 | Bose et al. | 718/105 |

* cited by examiner

*Primary Examiner* — Thomas Lee
*Assistant Examiner* — Jaweed A Abbaszadeh
(74) *Attorney, Agent, or Firm* — Blakely, Sokoloff, Taylor & Zafman LLP

(57) ABSTRACT

A technique to dynamically maintain the thermal levels of a plurality of cores of a processing system by interleave core hopping with throttling techniques. The interleaving logic may transfer execution of threads from a hot core to a cold if core hopping is applicable. Core hopping may be applicable if there exist a cold core to which the execution of threads can be assigned to from a hot core and if the rate of occurrence of core hopping is within an allowable rate value. The interleaving logic may apply throttling techniques if core hopping is not applicable. The throttling techniques may throttle the throttling parameters, which may comprise voltage, frequency, and micro-architecture throttling parameters provided to the hot core if the core hopping is not applicable.

20 Claims, 3 Drawing Sheets

DYNAMICALLY MANAGING THERMAL LEVELS IN A PROCESSING SYSTEM

BACKGROUND

Thermal levels of a processing system may change due to the heat generated by various components of the processing system that process tasks. The heat generated may limit the maximum operating frequency of the processing system. Dynamic thermal management (DTM) mechanisms such as the core hopping and throttling techniques may be used to maintain the thermal levels of the processing system. A time-based core-hopping may result in temperature reduction, wherein the execution of tasks may be moved from one core to the other after a pre-determined time duration elapses. A thermal-based core-hopping may result in performance increase, wherein the thermal-based core-hopping may be triggered by a thermal event. The throttling techniques may comprise dynamic voltage scaling, frequency scaling, micro-architecture throttling, and such other similar approaches.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a mechanism for dynamically managing thermal levels in a processing system. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
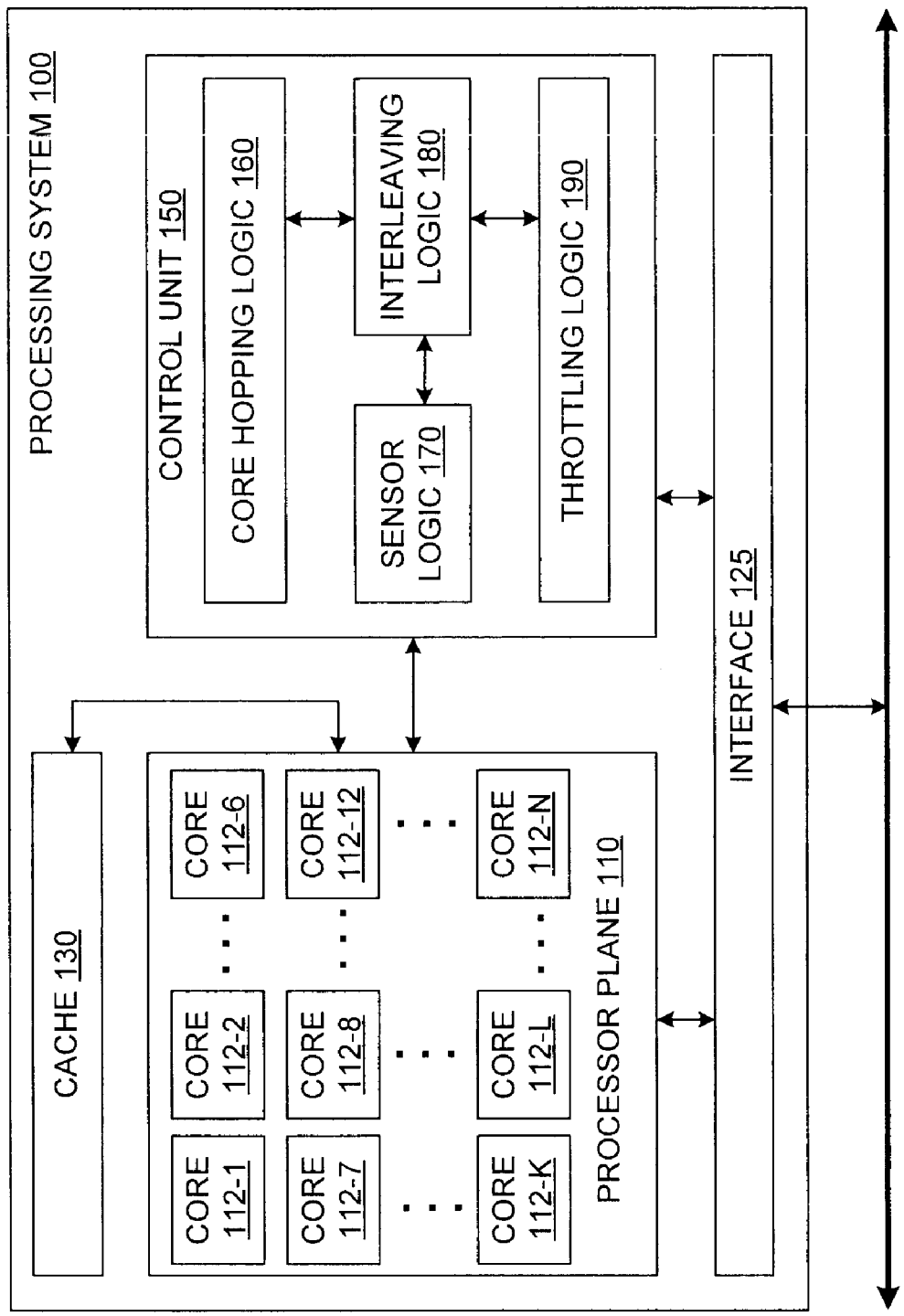
FIG. 1 illustrates an embodiment of a processing system 100.

An embodiment of a processing system 100 is illustrated in FIG. 1. The processing system 100 may comprise a processor plane 110, an interface 125, a cache 130 and, a control unit 150.

In one embodiment, the interface 125 may couple the processing system 100 to other blocks such as the chipset and the memory of a computer system. In one embodiment, the interface 125 may perform protocol translations and provide physical and electrical coupling between the processing system 100 and the other blocks of the computer system.

In one embodiment, the cache 130 may store data and instructions that are frequently retrieved by the processor plane 110. In one embodiment, the cache 130 may comprise static RAM (SRAM) memory, which may provide faster memory access times.

In one embodiment, the processor plane 110 may comprise multiple cores 112-1 through 112-N. In other embodiments, the processor plane 110 may comprise multiple power planes, graphics unit, and such other similar processing clusters. In one embodiment, one or more tasks may be assigned to the cores 112. In one embodiment, the core 112-1 may execute threads that may cause the thermal levels of the core 112-1 to increase. In one embodiment, increase in the thermal levels may create hot spots and reduce the performance of the processing plane 110. In one embodiment, to limit the thermal levels, the processing system 100 may employ core hopping and throttling techniques.

In one embodiment, the throttling techniques may comprise dynamic voltage scaling, dynamic frequency scaling, micro-architecture throttling, and such other similar approaches. In one embodiment, the micro-architecture throttling may include fetch-gating (FG), instruction level parallelism (ILP) reduction, and such other similar approaches. In one embodiment, the micro-architecture throttling may reduce the activity level of the processing system 100 by decreasing the rate at which the instructions are fetched.

In one embodiment, the control unit 150 may interleave core hopping and throttling techniques. In one embodiment, interleaving core hopping with the throttling technique may improve the performance of the processing system 100 while maintaining the thermal levels of the cores 112 below thermal threshold values. In one embodiment, the control unit 150 may comprise a core hopping logic 160, a sensor logic 170, an interleaving logic 180, and a throttling logic 190.

In one embodiment, the sensor logic 170 may comprise temperature sensors to sense the thermal levels of the cores 112. In one embodiment, the sensor logic 170 may generate thermal interrupts if the thermal levels of the cores 112 cross a pre-specified thermal threshold value. In other embodiment, the sensor logic 170 may generate a thermal interrupt in response to receiving an external request. In one embodiment, the sensor logic 170 may check whether the thermal levels of the cores 112 exceed the threshold and may generate the thermal interrupt if the thermal levels exceed the thermal threshold value. In one embodiment, the sensor logic 170 may receive an external request from the throttling logic 190.

In one embodiment, the interleaving logic 180 may monitor the time based events generated by the throttling logic 190 and poll for the thermal interrupts generated by the sensor logic 170 before initiating dynamic thermal management (DTM) process. In one embodiment, the interleaving logic 180 may generate control signals to initiate interleaving of core hopping with the throttling techniques based on monitoring of time-based events and the thermal interrupts. In one embodiment, the interleaving logic 180 may also be configured with an allowable rate value, which may indicate an upper limit for the core hopping rate. In one embodiment, the interleaving logic 180 may initiate core hopping based on whether the core hopping is less than the allowable rate value.

In one embodiment, the core hopping logic 160 may use thermal-based core hopping in response to receiving a core hop control signal generated by the interleaving logic 180. In one embodiment, while using thermal-based core hopping, the threads assigned to a first core 112-1 may be transferred to a second core 112-2 if the first core 112-1 is in HOT state and the second core 112-2 is in COLD state. In one embodiment, the first core 112-1 may be referred to as being in HOT state if the thermal level of the first core 112-1 exceeds a hot threshold value. In one embodiment, the second core 112-2 may be referred to as being in COLD state if the thermal level of the second core 112-2 is lesser than a cold threshold value.

In one embodiment, the core first 112-1 may be heavily loaded and, as a result, the thermal level of the first core 112-1 may exceed the hot threshold value. However, the second core 112-2 may be lightly loaded and, as a result, the thermal level of the second core 112-2 may be lesser than the cold threshold value.

In one embodiment, the throttling logic 190 may dynamically scale one or more throttling parameters such as voltage, frequency, and micro-architecture throttling parameters provided to the cores 112 to maintain the thermal level below the thermal threshold value. In one embodiment, the throttling logic 190 may scale the throttling parameters provided to the first core 112-1 in response to an interleave control signal received from the interleaving logic 180. In one embodiment, the throttling logic 190 may also send an external request to the sensor logic 170 that may cause the sensor logic 170 to generate the thermal interrupt.

Figure 2:
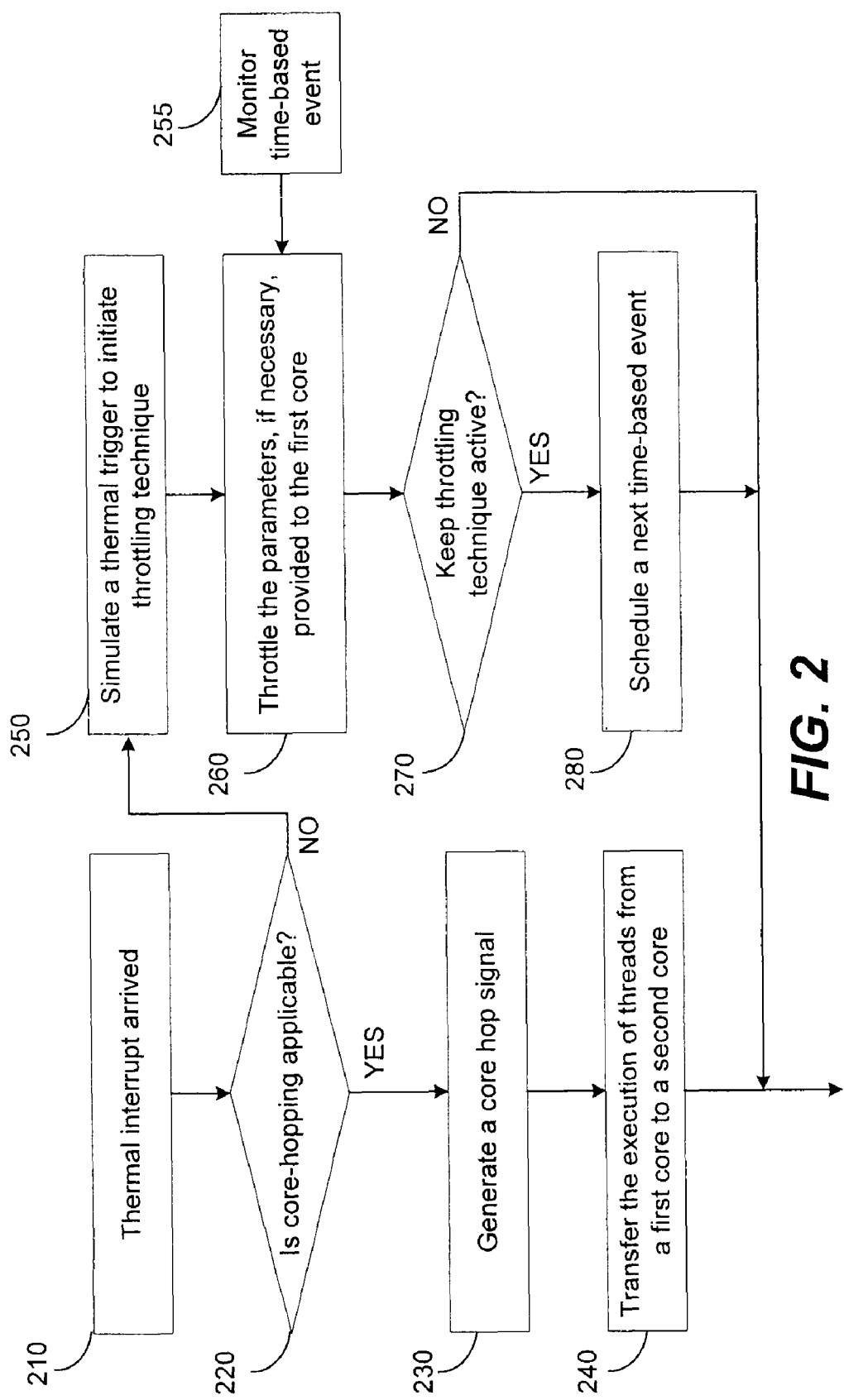
FIG. 2 illustrates an embodiment of the processing system 100 managing thermal levels dynamically.

An embodiment of the processing unit 100, which dynamically manages thermal levels is described in FIG. 2.

In block 210, the interleaving logic 180 may sense the arrival of thermal interrupt generated by the sensor logic 170. In one embodiment, the thermal interrupt may be generated if the temperature of the first core 112-1 exceeds the hot thermal threshold.

In block 220, the interleaving logic 180 may determine if core hopping is applicable and control passes to block 230 if core hopping is applicable and to block 250 otherwise. In one embodiment, the interleaving logic 180 may check if there exists at least one core in COLD state to which the execution of threads may be transferred to from the first core 112-1, which is in HOT state. Also, the interleaving logic 180 may check whether the rate of occurrence of core hopping is within the allowable rate value.

In one embodiment, the interleaving logic 180 may determine the core hopping to be inapplicable if the rate of occurrence of core hopping exceeds the allowable rate value. In one embodiment, frequent core hopping may offset the performance increase caused due to interleaving of core hopping and throttling techniques.

In block 230, the interleaving logic 180 may generate the core hop control signal. In block 240, the core hopping logic 160 may transfer the execution of threads from the first core 112-1 to the second core 112-2. In one embodiment, the interleaving logic 180 may determine that the second core 112-2 is in COLD state if the temperature value of the second core 112-2 is lesser than the cold threshold value.

In block 250, the interleaving logic 180 may simulate a thermal trigger to initiate throttling techniques and control passes to block 260.

In block 255, the interleaving logic 180 may monitor the time-based event, which may be generated by the throttling logic 190. In one embodiment, the interleaving logic 180 may cause control to be transferred to block 260 upon occurrence of the time-based event.

In block 260, the throttling logic 190 may throttle the throttling parameters, if necessary, provided to the first core 112-1. In one embodiment, the throttling logic 190 may throttle voltage, frequency, micro-architecture throttling parameters, and such other similar parameters provided to the first core 112-1.

In block 270, the interleaving logic 180 may determine whether throttling techniques is to be kept active and control passes to block 280 if the throttling technique is to be kept active and exits dynamic thermal management (DTM) mode otherwise.

In one embodiment, the interleaving logic 180 may keep the throttling technique active based on the level of the throttling parameters. Also, in one embodiment, interleaving logic 180 may keep the throttling technique active if temperature of the first core 112-1 exceeds the hot threshold value.

In block 280, the interleaving logic 180 may poll for a next time-based event.

Figure 3:
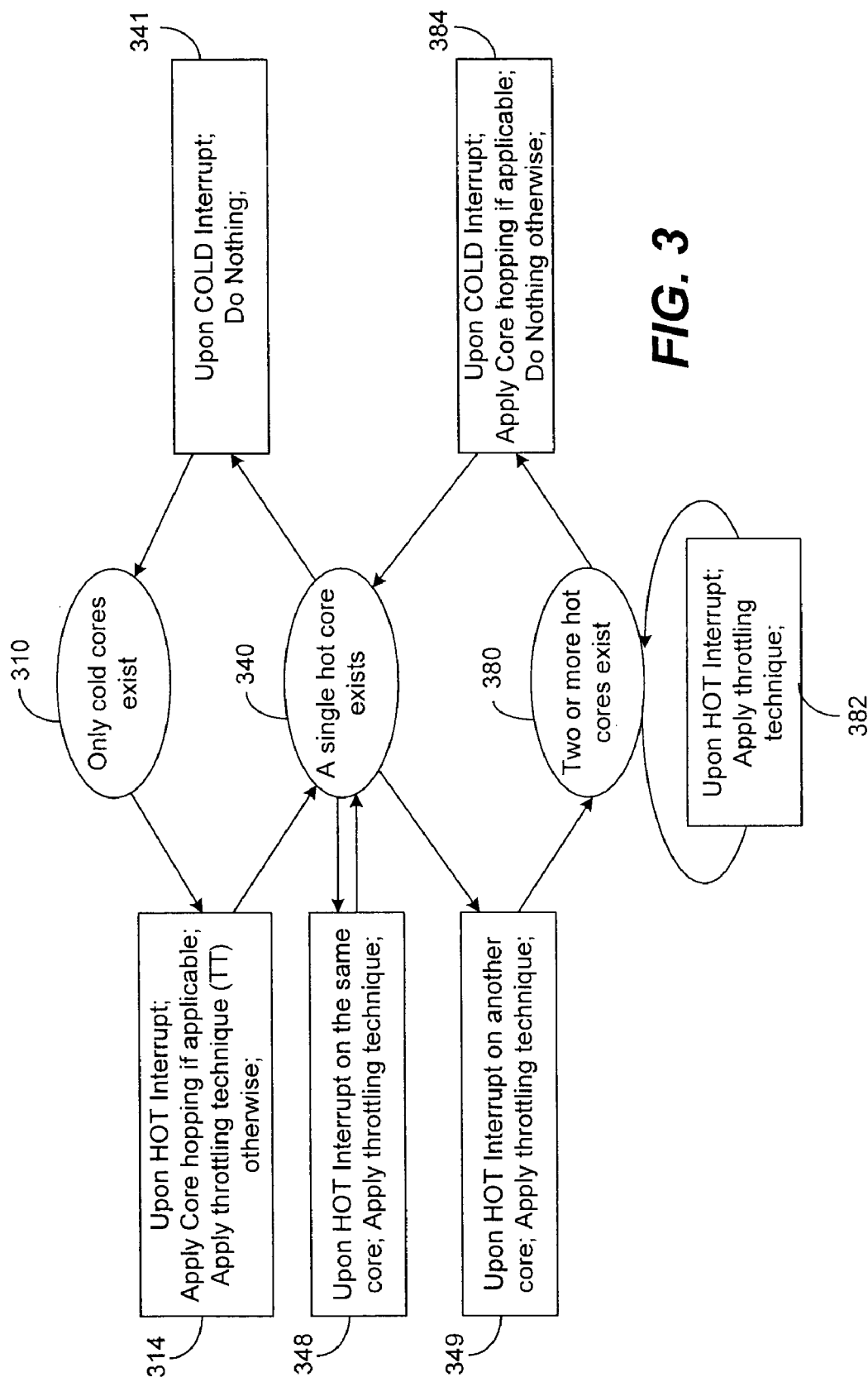
FIG. 3 depicts a state-machine illustrating interleaving core hopping with throttling techniques.

An embodiment of a state-machine illustrating interleaving core hopping with throttling technique is depicted in FIG. 3.

In one embodiment, the state 310 indicates that only cores in COLD state exist. In one embodiment, all the cores 112-1 through 112-N may be in COLD state during power ON phase.

In one embodiment, the thermal levels of the first core 112-1 may exceed the thermal threshold value and the interleaving logic 180 may generate an HOT interrupt after sensing the temperature of the core 112-1. As indicated by transition 314, upon occurrence of HOT interrupt, the thermal control unit 150 may apply core-hopping if applicable and may apply throttling technique otherwise.

As a result, the core-hopping logic 160 may transfer the threads executed on the core 112-1 to the core 112-2 if core-hopping is applicable and the throttling logic 190 may scale the throttling parameters provided to the core 112-1 otherwise. As a result of the transition 314, the state machine may move from state 310 to state 340.

As depicted in the state 340, there may exist one hot core 112-1. In transition 348, in one embodiment, the sensor logic 170 may generate HOT interrupt, which may indicate that the thermal value of the core 112-1 has exceeded the thermal threshold value. In one embodiment, the thermal control unit 150 may apply throttling techniques to the core 112-1. In one embodiment, as the HOT core interrupt occurs on the same core 112-1 the state machine may transition back to state 340.

In transition 349, in one embodiment, the sensor logic 170 may generate HOT interrupt to indicate that the thermal level of the core 112-2 has also exceeded the thermal threshold value. In one embodiment, the thermal control unit 150 may apply throttling techniques to the core 112-2. As a result of the transition 349, the state machine may move from the state 340 to the state 380.

As depicted in state 380, there may exist two or more hot cores. As indicated by the transition 382, in one embodiment, the sensor logic 170 may generate an HOT interrupt if the thermal levels of the cores 112 core exceed the thermal threshold value.

As depicted by transition 384, upon occurrence of COLD interrupt, the thermal control unit 150 may apply core-hopping if applicable and may not alter the status of the cores otherwise. As a result of the transition 384, the state machine may move from state 380 to state 340. As depicted by transition 341, upon occurrence of COLD interrupt, the thermal control unit 150 may not alter the status of the cores. As a result of the transition 341, the state machine may move from state 340 to state 310.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising:
   a plurality of cores,
   a sensor logic to generate a thermal interrupt in response to sensing temperature levels on the plurality of cores,
   an interleaving logic coupled to the sensor logic, wherein the interleaving logic is to,
      determine if core hopping is applicable wherein core hopping applicable if there exists at least one core in a cold state and if a rate of occurrence of core bopping is within a allowable rate value,
      generate a core hop signal if the core hopping is applicable, and
      provide a thermal trigger to initiate throttling if the core hopping is not applicable,
   a core hopping logic coupled to the interleaving logic, wherein the core hopping logic is to transfer execution of threads from a first core to a second core in response to receiving the core hop signal, and
   a throttling logic coupled to the interleaving logic, wherein the throttling logic is to change one or more throttling parameters to throttle the first core if the core hoping is not applicable.

2. The apparatus of claim 1, wherein the core hopping logic is to transfer execution of threads from the first core to the second core upon receiving the core hop signal wherein the first core is in a hot state and the second core is in the cold state, wherein the plurality of cores comprise the first core and the second core.

3. The apparatus of claim 2, wherein the interleaving logic is to generate the core hop signal after determining that the core hopping is applicable, wherein the interleaving logic is to determine that the core hopping is applicable in response to receiving the thermal interrupt.

4. The apparatus of claim 3, wherein the interleaving logic is to determine that core hopping is applicable if thermal level of the first core exceeds a hot threshold value and thermal level of the second core is less than a cold threshold value.

5. The apparatus of claim 1, wherein the throttling logic is to decrease the one or more throttling parameters provided to the first core in response to receiving the thermal trigger, if core hopping is not applicable.

6. The apparatus of claim 5, wherein the one or more throttling parameters comprise voltage, frequency, and micro-architecture throttling parameters.

7. The apparatus of claim 1, wherein the interleaving logic is to determine that core hopping is not applicable if thermal level of the second core is more than a cold threshold value or if the rate of occurrence of core hopping is more than the allowable rate value.

8. The apparatus of claim 1, wherein the throttling logic is to scale the one or more throttling parameters provided to the first core in response to occurrence of a time-based event, while core hopping is not applicable.

9. The apparatus of claim 1, wherein the interleaving logic is to keep the throttling active based on a level of one or more throttling parameters.

10. The apparatus of claim 1, wherein the interleaving logic is to keep the throttling active if the thermal value of the first core exceeds the hot threshold value.

11. A method comprising:
    generating a thermal interrupt in response to sensing temperature levels on the plurality of cores,
    determining if core hopping is applicable, wherein core hopping is applicable if there exists at least one core in a cold state and if a rate of occurrence of core hopping is within a allowable rate value,
    generating a core hop signal if the core hopping is applicable,
    providing a thermal trigger to initiate throttling if the core hopping is not applicable,
    transferring execution of threads from a first core to a second core in response to receiving the core hop signal, and
    changing one or more throttling parameters to throttle the first core if the core hoping is not applicable.

12. The method of claim 11 further comprises transferring execution of threads from the first core to the second core upon receiving the core hop signal, wherein the first core is in a hot state and the second core is in the cold state, wherein a plurality of cores comprise the first core and the second core.

13. The method of claim 12 comprises generating the core hop signal after determining that the core hopping is applicable, wherein whether core hopping is applicable is determined in response to receiving the thermal interrupt.

14. The method of claim 13 comprises determining that core hopping is applicable if thermal level of the first core exceeds a hot threshold value and thermal level of the second core is less than a cold threshold value.

15. The method of claim 11 further comprises decreasing the one or more throttling parameters provided to the first core in response to receiving the thermal trigger if core hopping is not applicable.

16. The method of claim 15, wherein the one or more throttling parameters comprise voltage, frequency, and micro-architecture throttling parameters.

17. The method of claim 16 comprises determining that core hopping is not applicable if thermal level of the second core is more than a cold threshold value or if the rate of occurrence of core hopping is more than an allowable rate value.

18. The method of claim 11 further comprises scaling the one or more throttling parameters provided to the first core in response to occurrence of a time-based event, while core hopping is not applicable.

19. The method of claim 18 comprises keeping the throttling in active state based on a level of the one or more throttling parameters.

20. The method of claim 11 comprises keeping the throttling in active state if the thermal value of the first core exceeds a hot threshold value.

* * * * *